United States Patent [19]

Gaydarov et al.

[11] Patent Number: 4,698,462
[45] Date of Patent: Oct. 6, 1987

[54] TROLLEYBUS CURRENT COLLECTOR SYSTEM ENABLING COMMON LINE PASSING

[75] Inventors: Emanuil S. Gaydarov; Koytcho Y. Russev; Vassil A. Paltchin; Ivan T. Stoilov, all of Plovdiv, Bulgaria

[73] Assignee: Avtokombinat, Plovdiv, Bulgaria

[21] Appl. No.: 819,820

[22] Filed: Jan. 16, 1986

[30] Foreign Application Priority Data

Jan. 16, 1985 [BG] Bulgaria ................................ 68406

[51] Int. Cl.$^4$ ............................. B60L 5/34; B60L 5/08
[52] U.S. Cl. ..................................... 191/59.1; 191/51; 191/60.4
[58] Field of Search ......................... 191/50, 51, 57, 59, 191/59.1, 60, 60.1, 60.2, 60.3, 60.4, 64

[56] References Cited

U.S. PATENT DOCUMENTS

| | | | |
|---|---|---|---|
| 684,408 | 10/1901 | Burke | 191/51 |
| 1,893,373 | 1/1933 | Matthes | 191/64 X |
| 2,245,507 | 6/1941 | Szalay | 191/59.1 X |
| 2,304,058 | 12/1942 | Arnold | 191/59.1 |
| 2,396,049 | 3/1946 | Kallmann | 191/51 |
| 3,303,294 | 2/1967 | Howell, Jr. | 191/64 |

FOREIGN PATENT DOCUMENTS 2506234 11/1982 France ...................... 191/64

Primary Examiner—Robert B. Reeves
Assistant Examiner—John G. Pido

[57] ABSTRACT

A trolleybus current collector system which enables trolleybuses to pass or overtake one another while still remaining on the same one way supply line. The trolleybus current collector system described herein comprises a trolley pole, which is attached movably with its bottom part to the trolleybus, while its top part is connected to the outer end, with respect to the direction of driving, of an insulating carrier, onto which there are arranged current collector slide blocks. The pole is connected to the carrier by means of a compression body. The outer current collector slide block is mounted rigidly to the carrier. The inner current collector slide block is mounted movably in longitudinal direction with respect to the carrier. To each current collector slide block there is mounted, by means of respective internally diagonal deflectors, a current-carrying bridge. The compression body is fastened to pole parallel to the supply line. To it there is mounted a rocking unit with fixing module, which is connected to the outer end of the carrier. In the front part of each current-carrying bridge there is mounted an elongating mechanism, the control input of which is connected to the output of a control block, the first information input of which is connected via a transducer for direction to the supply line, while its second information input is connected to the output of a ray identifier, which is disposed frontally on the trolleybus, and immediately near the ray identifier there is disposed a ray emitter.

6 Claims, 13 Drawing Figures

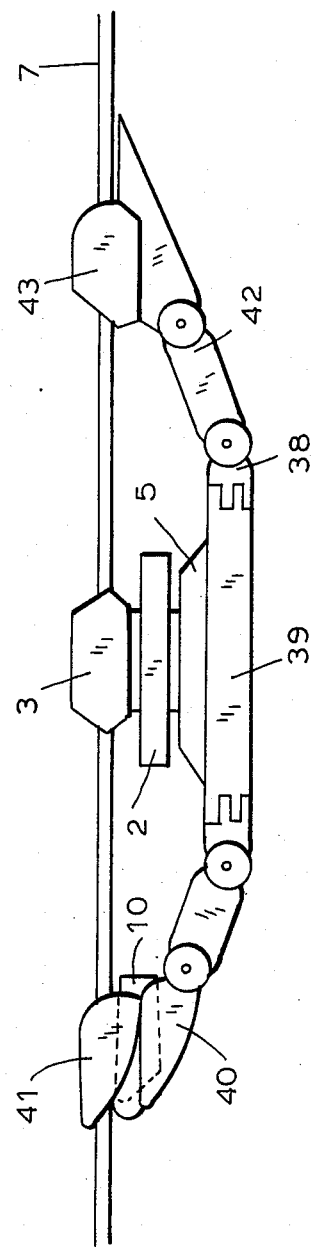
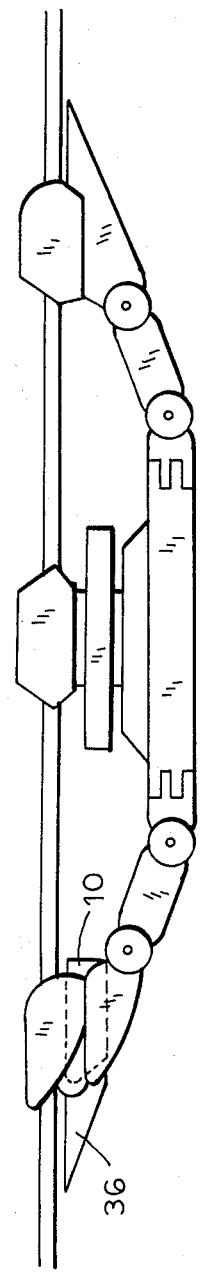

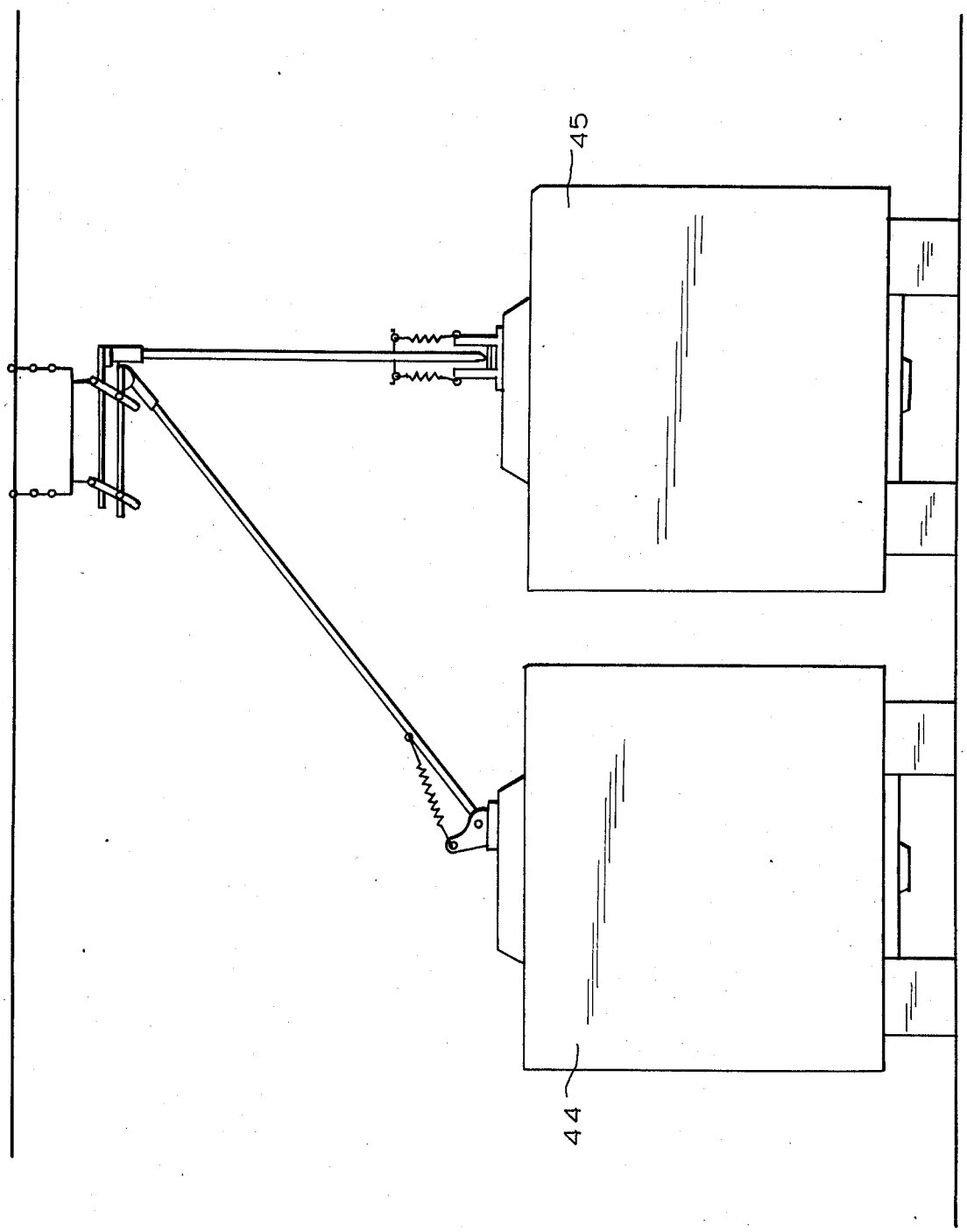

TROLLEYBUS CURRENT COLLECTOR SYSTEM ENABLING COMMON LINE PASSING

This invention relates to a trolleybus current collector system, which can be used in urban off-track electric transport.

A known trolleybus current collector system consists of outer and inner top and side current collector slide blocks, arranged onto an insulating carrier. The carrier is connected to a trolley pole divided in two parts, which are interconnected by means of a spring. The top part of the pole is articulately connected to the spider of the carrier, while the bottom end is fastened to the transport vehicle.

A drawback of the known trolleybus current collector system lies in the necessity of replacing the entire contact supply line in order to allow trolleybuses to overtake one another. Moreover, this known system can find only limited application, since it makes possible only the overtaking of the trolleybuses during the drive using one and the same current line in the same direction.

It is therefore a general object of this invention to develop a trolleybus current collector system with improved service performance, which makes possible the drive of trolleybuses using one and the same current line in both directions, i.e. the overtaking or passing one another using a one-way standard supply line.

This object is achieved by developing a trolleybus current collector system, comprising a trolley pole, which is movably attached with its bottom part to the trolleybus, while its top part is connected to the outer end, with respect to the direction of driving, of a carrier, onto which there are arranged current collector slide blocks. The pole is connected to the carrier by means of a compression body. The outer current collector slide block is rigidly mounted to the carrier. The inner current collector slide block is mounted movably in longitudinal direction with respect to the carrier. To each current collector slide block there is mounted, by means of a respective internal diagonal deflector, a current carrying bridge. The compression body is fastened to the pole parallel to the supply line. To it, there is mounted a rocking unit with fixing module, which is connected to the outer end of the carrier. In the front part of each current carrying bridge there is mounted an elongating mechanism. The control input of the elongating mechanism is connected to the output of a control block, while the first information input of the control block is connected via a transducer, for direction, to the supply line, while its second information input is connected to the output of a ray identifier, which is disposed frontally on the trolleybus. Immediately near the ray identifier there is disposed a ray emitter. The compression body consists of a closed on-one-side housing, which is connected by means of an axis and a torsion spiral spring which is rigidly connected to the pole oblique cylinder with a positioning pin. To the face of the closed on-one-side housing there is connected the rocking unit. This rocking unit consists of a casing with a profiled buffer chamber. To an axis there is mounted a free balance member, the guides of which are positioned through holes in the casing in the profiled buffer chamber. The free balance member is fixed by means of elastic fixing members horizontally positioned with respect to the casing. The fixing module comprises a top cover, which is rigidly fastened to the carrier, and a rotating top cup, which is inserted into a bottom fixing cup, which is connected rigidly to the free balance member of the rocking unit. In the top cover, the rotating top cup and the bottom fixing cup there is disposed centrally a compression axle. Radially in the periphery of the top rotating cup there are inserted in cylindrical holes spring-ball fixators, seated in fixing grooves in the bottom fixing cup. Each elongating mechanism comprises a casing, in the front part of which there is incorporated a pushing unit, which is connected to the centrally arranged elongating member, which is fixed in its rear part by means of an elastic return member to the rear wall of the casing. The electric input of the pushing unit is the control input of the elongating mechanism.

Each of the current-carrying bridges consists of an articulated arch, to the central member of which there is connected an internally-diagonal deflector. To its front member there is mounted, freely rotating around its vertical axis, a guide, in which the elongating mechanism is built-in. To the rear guiding member there is mounted a freely rotating vertical axis rear guide.

The advantage of the disclosed trolleybus current collector system lies in that it allows the drive of trolleybuses using one and the same current line in both directions and makes possible the overtaking or passing of one another using a one-way standard supply line.

For a better understanding of the invention, reference should be made to the accompanying drawings in which there is illustrated and described a preferred embodiment of the invention.

FIG. 4 is a general view of a current-carrying bridge with drawn-in elongating member of the elongating mechanism position in normal drive and overtaking;

FIG. 5 is a general view of a current-carrying bridge with forward-protruding elongating member of the elongating mechanism when the trolleybuses are passing one another;

FIG. 6 shows the position of the current collectors of two trolleybuses during overtaking.

Figure 1:
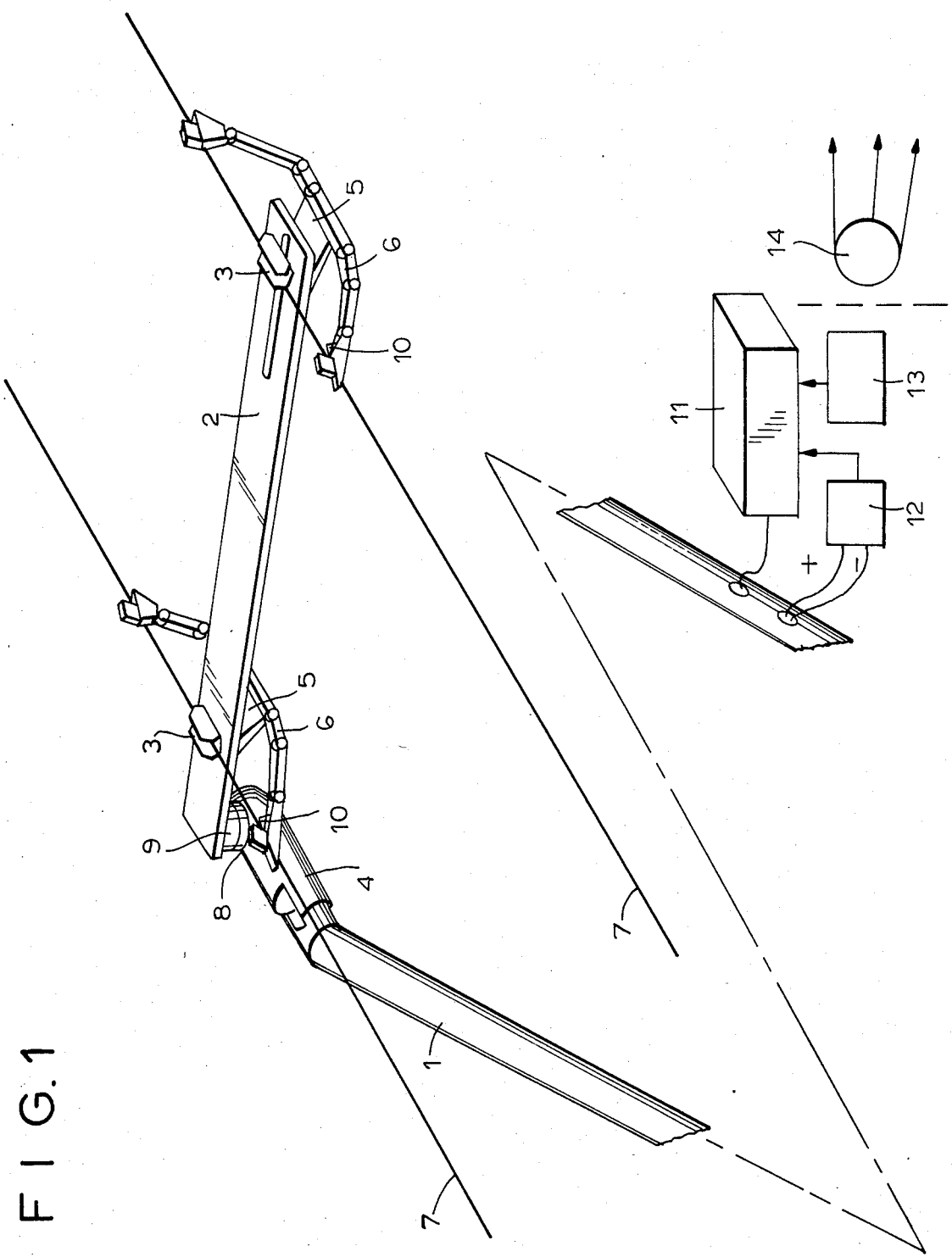
FIG. 1 is a general view of the trolleybus current collector system.

The trolleybus current collector system according to FIG. 1 consists of a trolley pole 1, which is attached movably with its bottom part to the trolleybus, while its top part is connected to the outer end, with respect to the direction of driving, of a carrier 2, onto which there are arranged current collector slide blocks 3. The pole 1 is connected to the carrier 2 by means of a compression body 4. The outer current collector slide block 3 is mounted rigidly to the carrier 2. The inner current collector slide block 3 is mounted movably in longitudinal direction with respect to the carrier 2. To each current collector slide block 3 there is mounted, by means of a respective internally diagonal deflector 5, a current-carrying bridge 6. The compression body 4 is fastened to the pole 1 parallel to the supply line 7. To it there is mounted a rocking unit 8 with fixing module 9, which is connected to the outer end of the carrier 2. In the front part of each current-carrying bridge 6 there is mounted an elongated mechanism 10. The control input of the elongated mechanism 10 is connected to the output of a control block 11, the first information input of which is connected via a transducer for direction 12 to the supply line 7, while its second information input is connected to the output of a ray identifier 13, which is disposed frontally on the trolleybus, and immediately near the ray identifier 13 there is disposed a ray emitter 14.

Figure 2:
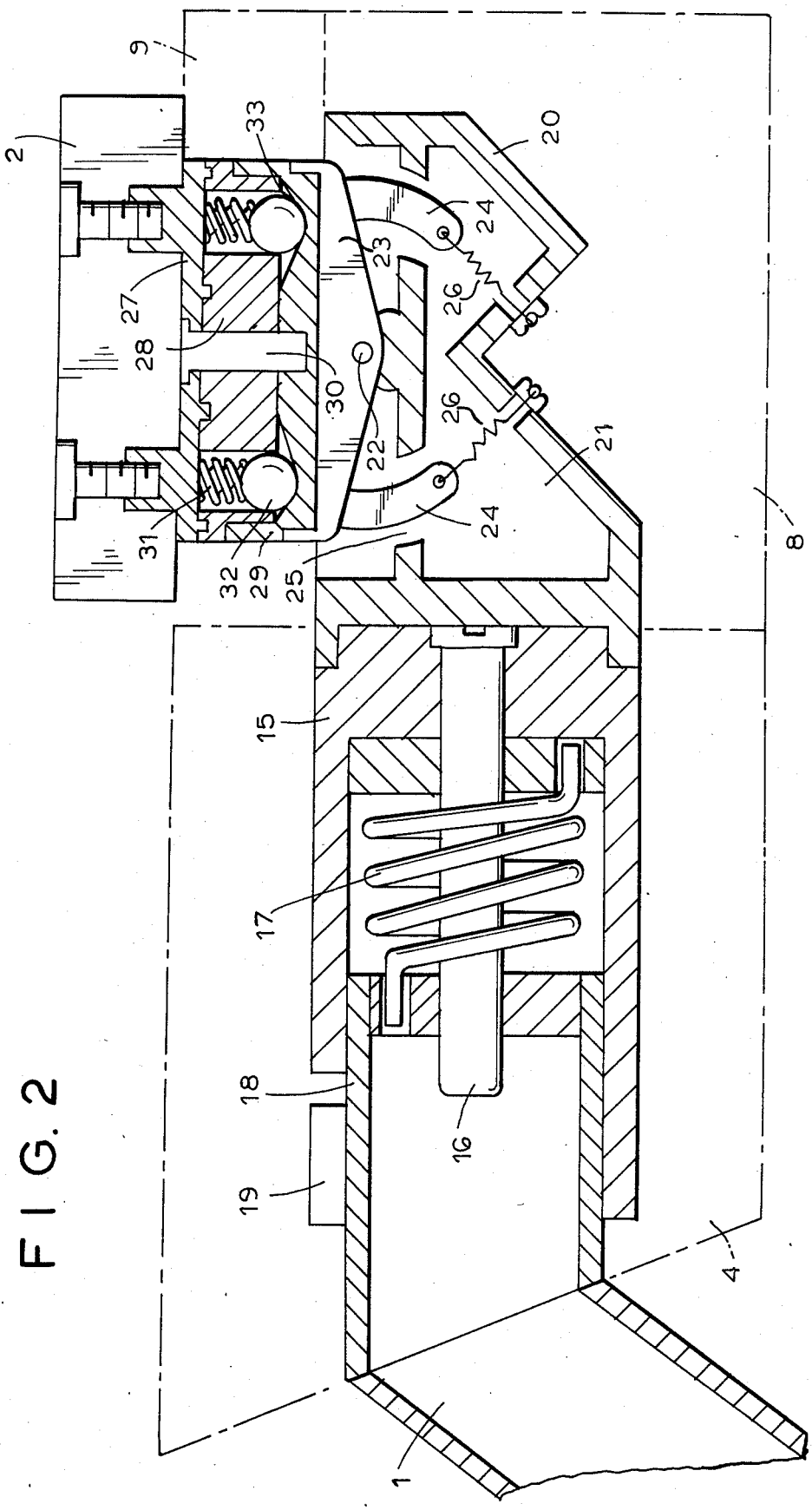
FIG. 2 is a cross-sectional view of the compression body with the rocking unit and the compression module.

The compression body 4, shown in FIG. 2, consists of a closed on-one-side housing 15, which is connected by means of an first axle 16 and a torsion spring 17 to a pole 1 which is rigidly connected to the oblique cylinder 18 with a positioning pin 19. To the face of the closed on-one-side housing 15 there is connected a rocking unit 8.

The rocking unit 8 consists, as shown in FIG. 2, of a casing 20 with a profiled buffer chamber 21. To an second axle 22 there is mounted a free balance member 23, the guides 24 of which are positioned through openings 25 in the casing 20 in the profiled buffer chamber 21. The free balance member 23 is fixed by means of elastic fixators 26 horizontally with respect to the casing 20.

The fixing module 9, as shown in FIG. 2, comprises a top cover 27, which is rigidly fastened to the carrier 2, and a rotating top cup 28. The top cup 28 is inserted into a bottom fixing cup 29, which is connected rigidly to the free balance member 23 of the rocking unit 8. In the top cover 27, the rotating top cup 28 and the bottom fixing cup 29 there is disposed centrally a compression axle 30. Radially in the periphery of the top rotating cup 28 there are inserted in cylindrical holes 31, spring-ball fixators 32, which are sealed in fixing grooves 33 in the bottom fixing cup 29.

Figure 3:
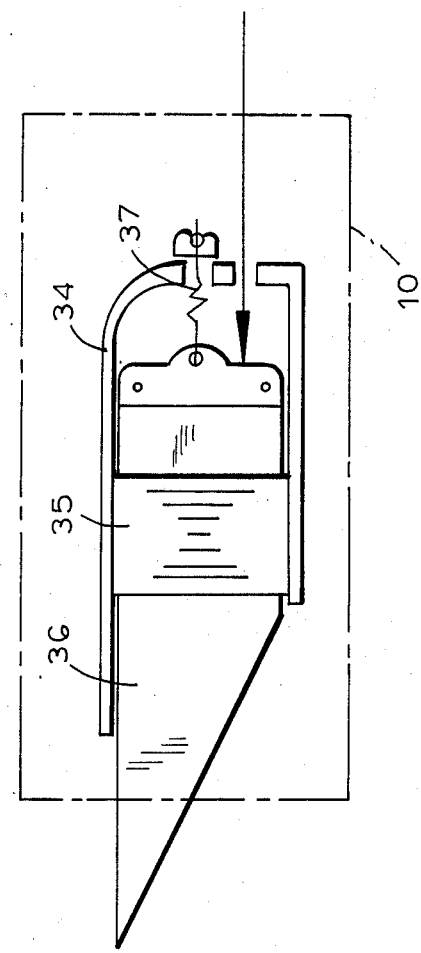
FIG. 3 is a general view of the elongating mechanism.

Each elongated mechanism 10 (FIG. 3) consists of a casing 34, in the front part of which there is incorporated a pushing unit 35, which is connected to the centrally arranged elongating member 36, which is fixed in its rear part by means of an elastic member 37 to the rear wall of the casing 34. The electric input of the pushing unit 35 is the control input of the elongating mechanism.

Each current-carrying bridge 6 (FIGS. 4 and 5) consists of an articulated arch 38, to the central member 39 of which there is connected the internally-diagonal deflector 5. To its front member 40 there is mounted, freely-rotating around its vertical axis, a front guide 41 in which the elongating mechanism 10 is built-in. To the rear member 42 there is mounted, freely-rotating around its vertical axis, a rear guide 43.

During overtaking (FIG. 6), the contact supply line 7, the overtaking trolleybus 44, and the overtaken trolleybus 45, are arranged as follows: to the contact supply line 7 there is in contact the current collector system of the overtaken trolleybus 45, while to its current-carrying bridges, there is in contact the current collector system of the overtaking trolleybus 44.

Figure 13:
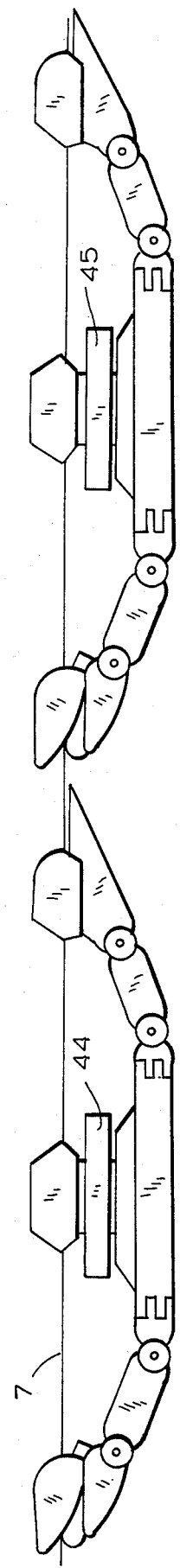
FIG. 7–13 show the dynamic development of the process of overtaking.
Figure 7:
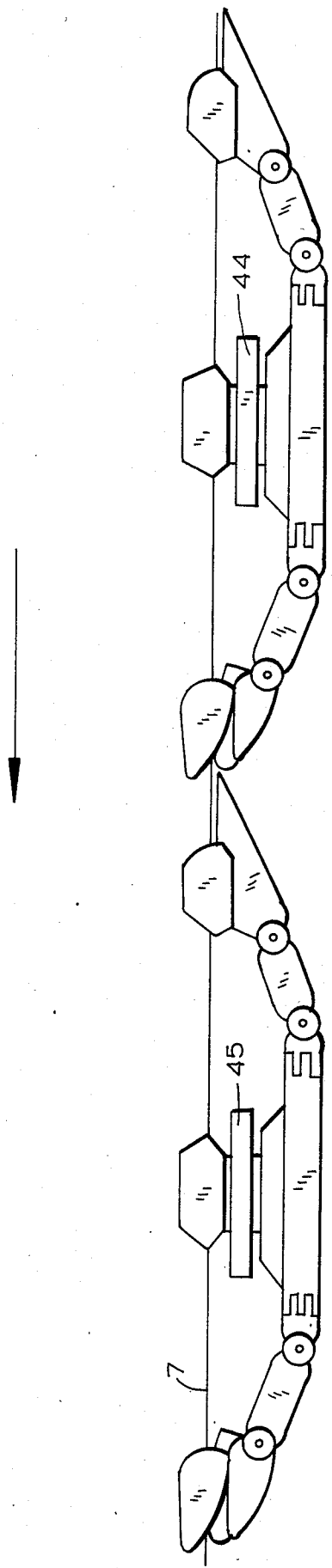
Figure 8:
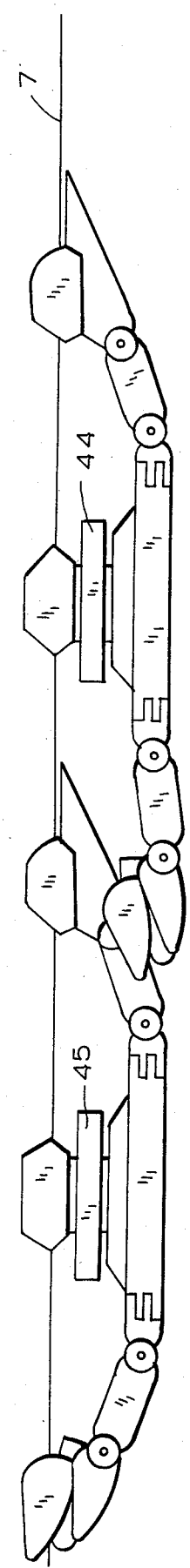
Figure 9:
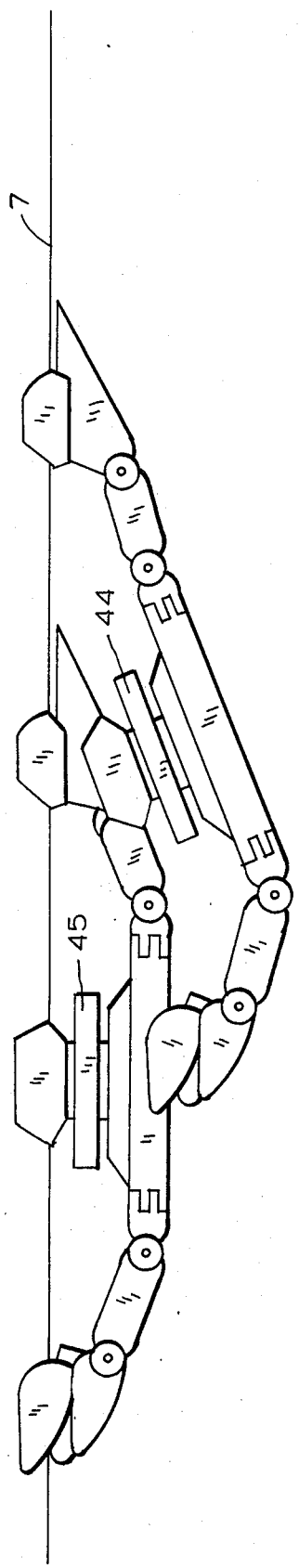
Figure 10:
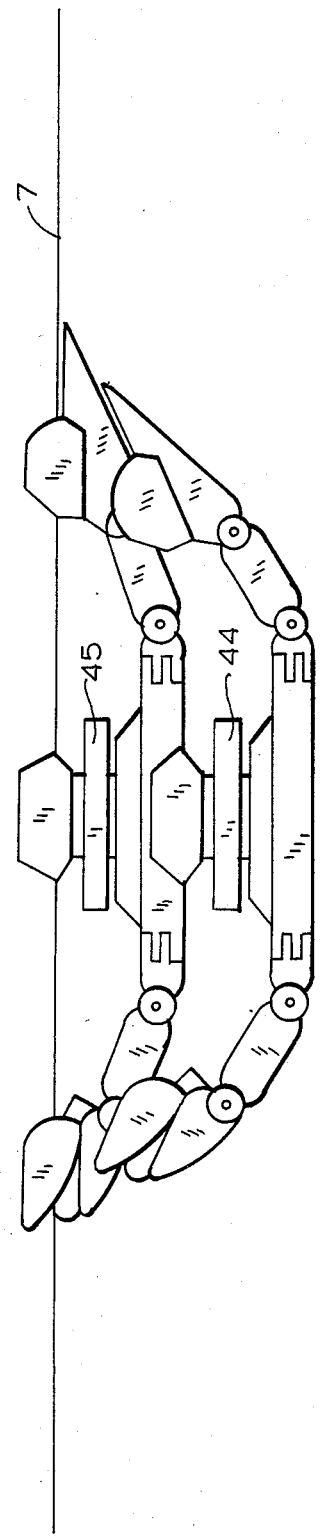
Figure 11:
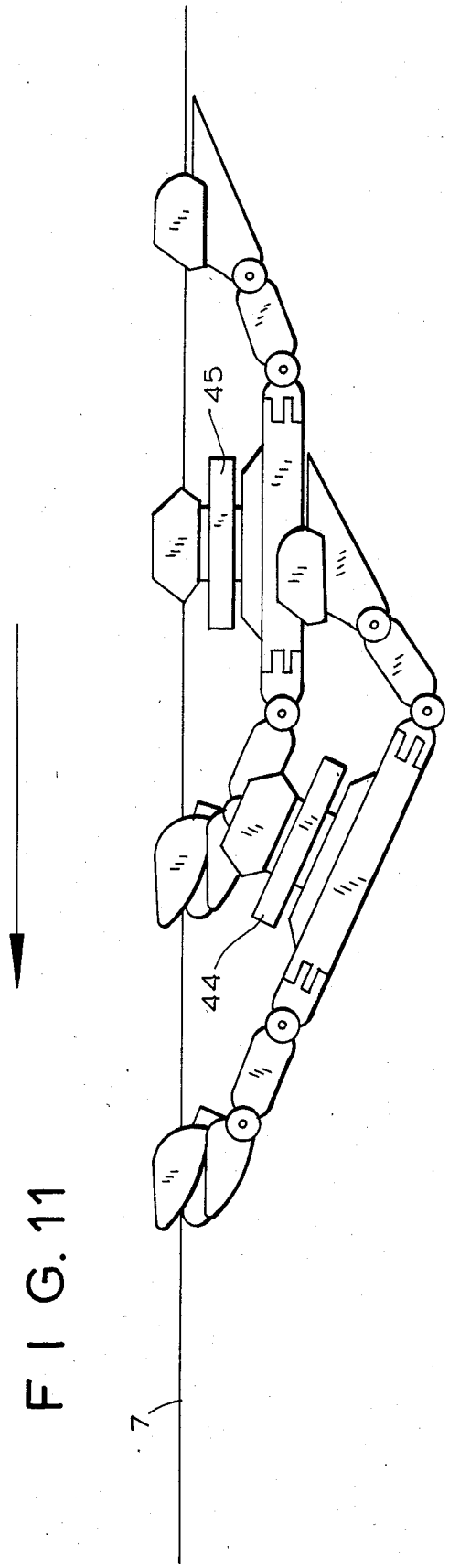
Figure 12:
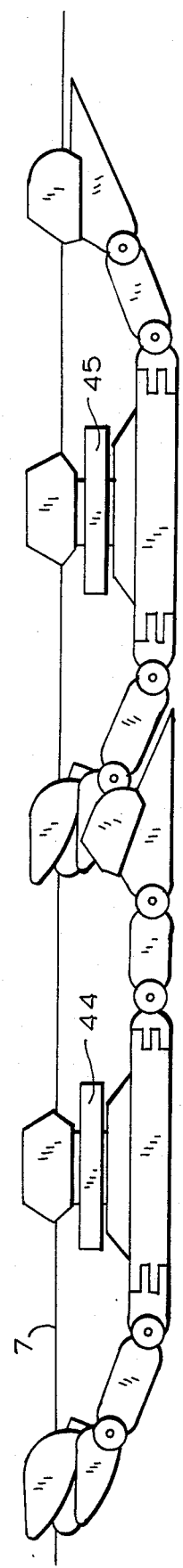

The operation of the trolleybus current collector system according to the invention is as follows:

In the overtaking of two trolleybuses (FIG. 6) driving in the same direction and using the same supply line 7, when the overtaking trolleybus 44 reaches the overtaken trolleybus 45 (FIG. 7), the current-carrying bridges 6 of the overtaking trolleybus 44 pass from the supply line 7 to the current-carrying bridges 6 (FIG. 8) of the overtaken trolleybus, and thanks to the rear members 42 (FIG. 4), they continue their motion along the current-carrying bridges 6 (FIGS. 9 and 11) and reach again the supply line 7 thanks to the front members 40 (FIGS. 12 and 13).

Since the current-carrying bridges 6 are vertically and sidewise offset from the current collecting slide blocks 3 by means of the internally-diagonal deflectors 5, the current collector of the overtaking trolleybus is moved downwards and inwards, and thus there is avoided any collision of the poles 1 of the current collectors of both trolleybuses.

The compression body 4 provides for an equal pressure of the current collecting slide blocks 3 against the supply line 7. The rocking unit 8 provides for the rocking of the carrier 2 around its longitudinal axis, and of the current collecting slide blocks 3 and the current-carrying bridges 6, respectively. This ensures the smooth passage of the trolleybus current collectors one underneath the other. The fixing module 9 provides for the rotation of the carrier 2 around the compression axis 30, thus equalizing the unequal peripheral velocities of the current collecting slide blocks 3 during the drive in a curve and the return of the carrier 2 in normal position during the drive in straight sectors of the road.

In the passing one another of two trolleybuses driving in opposite directions and using the same supply line the situation is as follows:

When the trolleybuses approach one another, the ray emitter 14 of each of them illuminate the ray identifiers 13 of the opposite trolleybus, and these pass a signal to the control block 11. The transducer for direction 12 is actuated in that trolleybus in which the polarity of the supply line 7 coincides with the polarity of its inputs. It passes a signal to the control block 11 in that trolleybus and it produces a control signal only in the case when the ray identifier and the transducer for direction are actuated simultaneously. Then the signal from the output of the control block 11 is passed to the pushing units 35 of the elongated mechanism 10, which push the elongating members 36 forward, and the front members of the current-carrying bridges 6, in only one of the trolleybuses, become identical to the rear members. Then the current collector of the other trolleybus passes obligatorily underneath it. The process of the passing of both current collectors, one underneath the other, is analogous to that in the case of overtaking.

In the moment of passing one another, thanks to that the compression body 4 fastened at an angle to the pole 1, the poles 1 are moved sidewards and any collision of the current-carrying bridges 6 of the poles 1 of both trolleybuses is avoided.

From the foregoing detailed description, it can be seen that the present invention provides a new and improved trolleybus current collector system which permits the drive of trolleybuses using one and the same current line in both directions. That is, it permits the overtaking or passing of each trolleybus by another, using one-way standard supply line.

Although the invention is described and illustrated with reference to a preffered embodiment, it is to be expressly understood that it is in no way limited to the disclosure of such preferred embodiment but is capable of numerous modifications within the scope of the appended claims.

We claim:

1. A trolleybus current collector system comprising:
   a trolley pole, said trolley pole is operatively connected at its bottom part to the trolleybus;
   an insulated carried, said carrier is operatively connected to the top part of the trolley pole;

inner and outer adjacent current collector slide blocks, said blocks are arranged on the opposing ends of the insulated carrier;

a compression body, said body is operatively connected to said trolley pole at the outer end slide block relative to the driving direction of said carrier; the outer current collector slide block is rigidly mounted to said carrier while the inner current collector slide block is movably mounted in the longitudinal direction with respect to said carrier;

a current-carrying bridge having a respective internally diagonal deflector, said bridge is operatively mounted to each current collector slide block, and the compression body is fastened to said trolley pole parallel to a supply line;

a rocking unit having a fixing module, said rocking unit is operatively mounted on the compression body, and said rocking unit is connected at its other end to the outer end slide block of the carrier;

an elongating mechanism with a control input, said mechanism is operatively mounted to the front part of each current-carrying bridge;

a control block, and a transducer, said control block being operatively connected via said transducer to the supply line;

a ray identifier, said identifier is operatively mounted on the front of the trolleybus, and a ray emitter, said emitter is operatively mounted adjacent to said ray identifier, whereby the control input of the elongating mechanism is connected to the output of the control block, the first information input of which is connected via the transducer for direction to said supply line, while its second information input is connected to the output of the ray identifier.

2. A trolleybus current collector system according to claim 1, wherein the compression body comprises a closed on-one-side housing, to the face of which there is connected the rocking unit;

a first axle surrounded by a torsion spiral spring; whereby said first axle connects the opposing side of said housing to the trolley pole;

an oblique cylinder, said cylinder is rigidly connected to said trolley pole; and a positioning pin which operatively connects the torsion spring to the oblique cylinder.

3. A trolleybus current collector system according to claim 1, wherein the rocking unit comprises a casing having a profiled buffer chamber;

a second axle and a free balance member, said free balance member is operatively mounted on the second axle and has guides which are positioned through openings in said casing of said profiled buffer chamber; and elastic fixators, positioned horizontally with respect to the casing, whereby said fixators stabilize the free balance member.

4. A trolleybus current collector system according to claim 1, wherein the fixing module comprises a top cover, said cover is rigidly fastened at its top to said carrier;

a rotating top cup having cylindrical holes which is fastened to the bottom of said top cover;

a bottom fixing cup having fixing grooves, into which is inserted the rotating top cup; said bottom fixing cup is rigidly connected to said free balance member of said rocking unit;

a compression axle, said axle is centrally disposed in said top cover, rotating top cup and said bottom fixing cup; and spring-ball fixators, seated in the fixing grooves of said bottom fixing cup, are inserted in the cylindrical holes of rotating top cup.

5. A trolleybus current collector system according to claim 1, wherein the each elongating mechanism comprises a casing having a front end and a rear wall;

a pushing unit, frontally disposed in the casing;

a centrally arranged elongating member, said member is connected to said pushing unit; and an elastic return member, connected to the opposing side of said pushing unit, which fixes the rear part of the elongating member to the rear wall of said casing; wherein the electric input of said pushing unit is the control input of the elongating mechanism.

6. A trolleybus current collector system according to claim 1, wherein each current-carrying bridge comprises an articulated arch having a central, front, and rear members; wherein said internally diagonal deflector is connected to said central member;

a front guide, in which said elongating mechanism is built-in, said front guide is mounted, freely-rotating around its vertical axis, to said front member; and a rear guide, said rear guide is mounted, freely-rotating around its vertical axis, to said rear member.

* * * * *